(12) United States Patent
Suzuki

(10) Patent No.: US 6,491,210 B1
(45) Date of Patent: Dec. 10, 2002

(54) METHOD AND APPARATUS OF BUTT WELDING

(75) Inventor: Shunji Suzuki, Newcastle upon tyne (GB)

(73) Assignee: Nissan Motor Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/298,948

(22) Filed: Apr. 26, 1999

(30) Foreign Application Priority Data

Apr. 27, 1998 (JP) .......................................... 10-117317

(51) Int. Cl.[7] ...................... B23K 37/00; B23K 31/02; B21D 39/00
(52) U.S. Cl. ...................... 228/170; 228/173.2; 228/5.7; 228/49.4; 228/141.4; 228/212
(58) Field of Search ................ 228/170, 173.2, 228/212, 5.7, 49.4, 141.1, 159; 219/121.63, 121.64

(56) References Cited

U.S. PATENT DOCUMENTS

| | | | | |
|---|---|---|---|---|
| 4,129,244 A | * | 12/1978 | Morris | 228/170 |
| 4,626,651 A | * | 12/1986 | Taniguchi et al. | 219/121 LC |
| 4,733,815 A | * | 3/1988 | Sturm | 228/4.1 |
| 4,840,303 A | * | 6/1989 | Fujii et al. | 228/164 |
| 4,988,845 A | * | 1/1991 | Bauer et al. | 219/121.63 |
| 5,172,846 A | * | 12/1992 | Hayashi et al. | 228/5.7 |
| 5,182,428 A | * | 1/1993 | Jack et al. | 219/121.63 |
| 5,190,204 A | * | 3/1993 | Jack et al. | 228/5.7 |
| 5,502,292 A | * | 3/1996 | Pernicka et al. | 219/121.64 |
| 5,532,451 A | * | 7/1996 | La Rocca | 219/121.64 |
| 5,536,915 A | * | 7/1996 | Peru et al. | 219/121.63 |
| 5,731,566 A | * | 3/1998 | Steinhart | 219/121.63 |
| 5,780,802 A | * | 7/1998 | Gnann et al. | 219/121.14 |
| 5,814,786 A | * | 9/1998 | Johnson et al. | 219/121.63 |
| 5,878,944 A | * | 3/1999 | Aebersold et al. | 228/212 |
| 5,884,832 A | * | 3/1999 | Funamoto et al. | 228/13 |
| 5,925,268 A | * | 7/1999 | Britnell | 219/121.63 |
| 5,932,117 A | * | 8/1999 | Johnson et al. | 219/121.63 |
| 5,948,295 A | * | 9/1999 | Perret et al. | 219/125.1 |
| 5,994,665 A | * | 11/1999 | Nishibayashi et al. | 219/121.64 |
| 6,031,199 A | * | 2/2000 | Ream et al. | 219/121.63 |
| 6,086,296 A | * | 7/2000 | Katsura et al. | 409/139 |

FOREIGN PATENT DOCUMENTS

JP 10-296490 * 11/1998 ............... 228/141.1

* cited by examiner

*Primary Examiner*—Tom Dunn
*Assistant Examiner*—L. Edmondson
(74) *Attorney, Agent, or Firm*—McDermott, Will & Emery

(57) ABSTRACT

A method of butt welding is performed in the following steps: a step of pressing first and second blank materials onto first and second loading bases respectively by clamping devices thereby fixing them; a step of shearing end surfaces of the first and second blank materials thereby forming joint surfaces; and a step of performing butt welding on each of the joint surfaces of the first and second blank materials while these blank materials are maintained in fixed state where the first and second blank materials are pressed by the clamping devices.

3 Claims, 9 Drawing Sheets

METHOD AND APPARATUS OF BUTT WELDING

BACKGROUND OF THE INVENTION

1. Field of the Invention

The present invention relates to a method and an apparatus of butt welding and, more particularly, to a method and an apparatus of butt welding which enable to suppress deformation of sheared first and second blanks and enable to butt weld the sheared first and second blanks even in a case where straightness of joint surfaces of the sheared first and second blanks are likely impaired due to the residual stress after the first and second blanks are sheared.

2. Description of Earlier Technology

In earlier technology, at a stage of a producing operation of a side panel outer which is a piece of automobile parts, a tailored blank material is previously produced by jointing a plurality of blank materials by butt welding each joint surface of the plurality of blank materials in a butt welding machine or in a laser welding machine. Generally, there are variable case, for example, a case where each of the plurality of blank materials has same thickness and material quality or another case where each of the plurality of blanks material has different in both the thickness and the material quality. Sequentially, the tailored blank material is worked by pressing operation or stamping operation in a power press machine with desired molds or desired dies, and is made into the side panel outer of the automobile.

SUMMARY OF THE INVENTION

Figure 1:
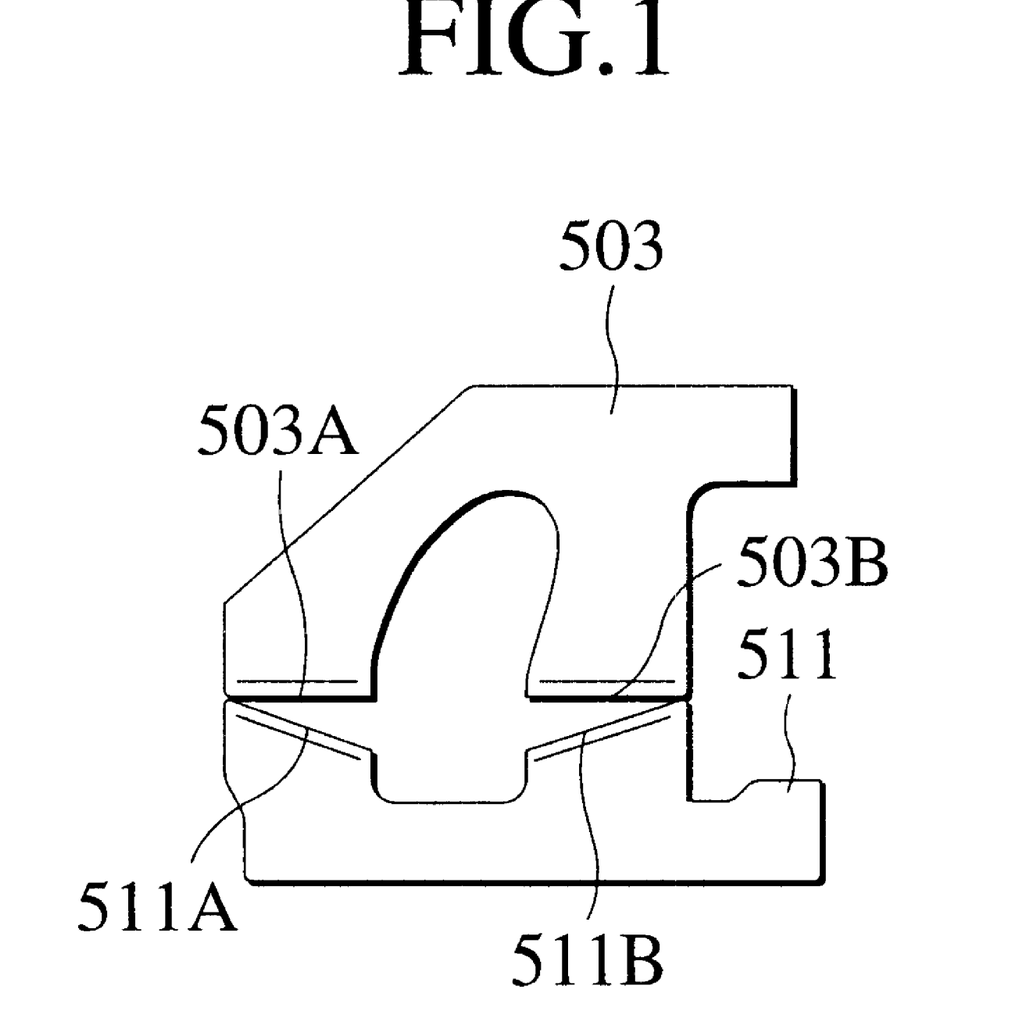
FIG. 1 is an explanatory view illustrating a blank material that has been worked by shearing and joining method in an earlier technology.

Since a residual stress exists in a coiled steel plate, when shearing the blank material by a metal mold of a press machine, it sometimes happens that the residual stress is released with the result that the straightness of the joint surfaces of the blank material is impaired. In this case, it is arranged that in a construction wherein as illustrated in FIG. 1 a relatively large notch or recessed portion is formed in the central part of each of blank materials 503, 511 and joint surfaces 503A, 503B, or 511A, 511B are formed on both sides of each blank material the joint surface has been formed on a forward end portion of the portion that has been sheared in three directions. Therefore, the straightness of the joint surface is largely deteriorated and this raises the problem that even when butting the joint surfaces 503A, 503B of the first blank and the joint surfaces 511A, 511B of the second blank material to each other, a relatively large gap is formed between these butted surfaces and, when butt welding is performed, humping beads are likely to be produced.

The present invention has been made in view of the above-described matters.

It therefore is an object of the present invention to provide a method and an apparatus of butt welding which enable to suppress deformation of sheared first and second blank materials and enable to butt weld the sheared first and second blank materials even in a case where straightness of joint surfaces of the sheared first and second blank materials are likely impaired due to the residual stress after the first and second blank materials are sheared.

To achieve the object, a method of butt welding according to an aspect of the present invention comprises the following steps: pressing first and second blank materials onto first and second loading bases respectively, by clamping devices thereby fixing them; shearing end surfaces of the first and second blank materials thereby forming joint surfaces; and performing butt welding on each of the joint surfaces of the first and second blank materials while these blank materials are maintained in fixed state where the first and second blank materials are pressed by the clamping devices.

According to the present invention, even when after having sheared the end surfaces of the first and second blank materials the residual stress is released and as a result a deformation tends to occur to impair the straightness of the joint surfaces, since the first and second blank materials are held in a state where they are pressed and fixed on the first and second loading bases by the clamping device, it results that the tendency that the straightness of the joint surfaces will be deteriorated is suppressed and the straightness thereof is maintained as is.

And, since in a state where the first and second blank materials are maintained to be pressed and fixed the joint surfaces are butted together, the butting of the joint surfaces are performed with a high precision. Thereafter, butt welding is performed thereon, with the result that highly precise butt welding is realized.

An apparatus of butt welding according to another aspect of the present invention comprises: a first loading base that has a clamping device to clamp a first blank material, the clamping device being capable of holding the first blank material in a state where this blank material is pressed and fixed on the first loading base; a second loading base that has a clamping device to clamp a second blank material, the clamping device being capable of holding the second blank material in a state where this blank material is pressed and fixed on the second loading base; a first shearing machine to shear an end surface of the first blank material pressed and fixed onto the first loading base and thereby forming a joint surface; a second shearing machine to shear an end surface of the second blank material pressed and fixed onto the second loading base and thereby forming a joint surface; and a butt welding machine to perform butt welding on the joint surfaces of the first and second blank materials which are butted each other by the first and second loading base in a state where the first and second blank materials blank materials are maintained to be pressed and fixed onto the first and second loading base, respectively.

According to this aspect of the invention, the deformation that occurs due to the residual stress after having sheared the first and second blank materials by the shearing machine is suppressed by the blank materials being pressed and fixed by the clamping device.

Accordingly, it is possible to perform butt welding on the joint surfaces of the first and second blank materials highly precisely and therefore to realize excellent butt welding.

In the apparatus of butt welding described above, in case where the first and second loading bases are equipped with each of a blank positioning device capable of positioning end portions of the blank materials on the loading bases, each of the end portions of the blank materials has protruded from each of the end edges of the loading bases.

Accordingly, when shearing the end portion of the blank material and thereby forming a joint surface, the portion in the vicinity of the shearing portion of the blank material can be pressed and fixed by a blank holder equipped to the shearing machine and as a result highly precise shearing can be performed.

Furthermore, in case where position pressing and fixing the first and second blanks by the clamping device is set at a location near the shearing surface in order to prevent wrinkle from occurring due to the influence of a plastic deformation at the time of shearing performed by the shearing machine, the wrinkle will be reduced at the position in the vicinity of the sheared portion, therefore the straightness precision at the time of shearing can be maintained.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

Figure 2A:
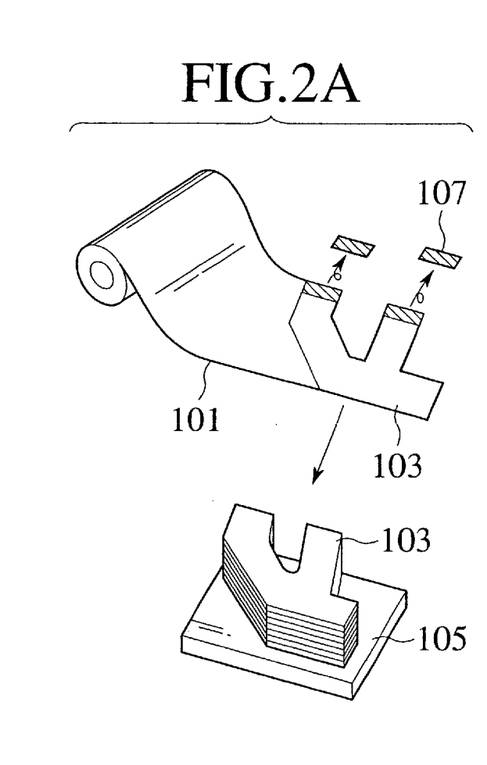
FIGS. 2A, 2B and 2C are each an explanatory view illustrating the process of preparing blank materials and performing butt welding thereon according to a first embodiment of the present invention.

First, in order to prepare a tailored blank material, as illustrated in FIG. 2A, a blank material 103 is punched out from a coiled steel plate 101 by using dies or molds and this blank material is stocked on a pallet 105. When punching out the blank material 103 as described above, the blank material 103 has its end portion 107 sheared so as to enable joint surface to be accurately butted together in a succeeding process of butt welding, i.e., for the purpose of enhancing the joint surface.

Figure 2B:
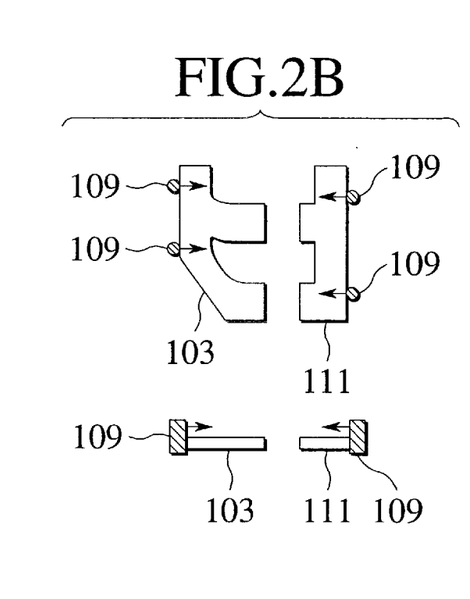
Figure 2C:
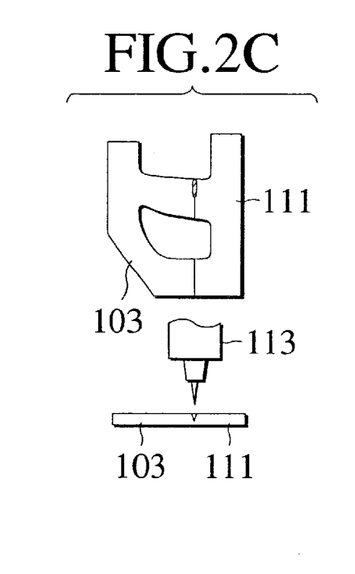

As illustrated in FIG. 2B, the blank material 103 that has been sheared as described above is butted with another blank material 111 by butting jigs 109 and then, as illustrated in FIG. 2C, the both blank materials are butt welded to each other by using a working head 113 of a butt welding machine.

Figure 3A:
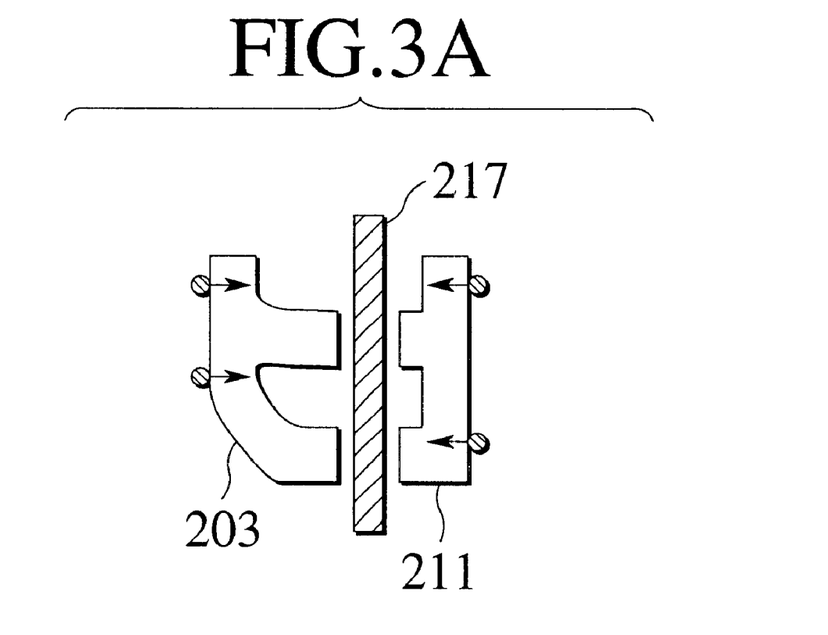
FIGS. 3A and 3B are explanatory views illustrating an example of working according to a second embodiment of the present invention.
Figure 3B:
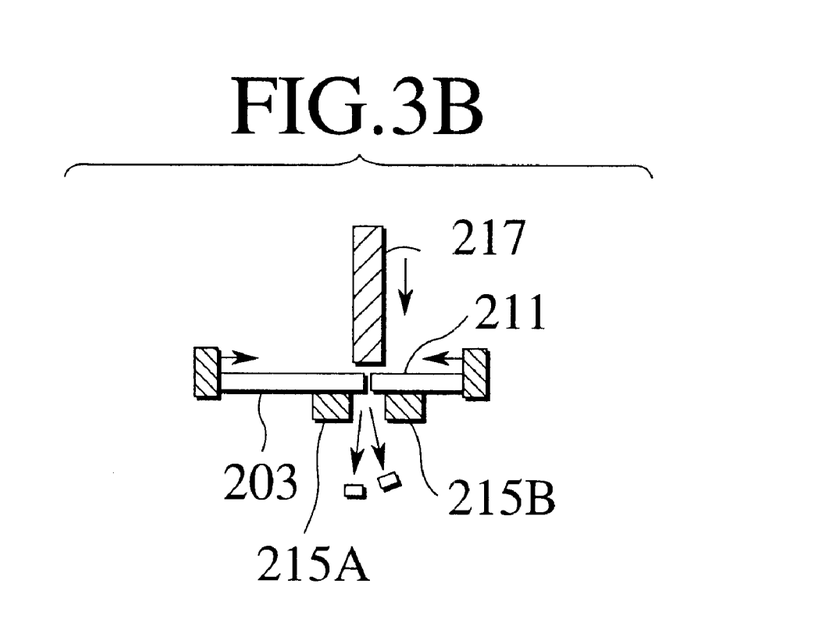

Next, a second embodiment wherein the form of shearing has been modified will be explained. Before the performance of the butt welding in the above-described first embodiment, in order to further enhance the butting precision of the joint surfaces between a first blank material 203 and a second blank material 211, as illustrated in FIGS. 3A and 3B, the first and second blank materials 203, 211 are disposed, in the state that they are opposed to each other, on a shearing machine equipped with opposing lower blades 215A and 215B. Then, the blank materials 203, 211 are simultaneously sheared with the use of an upper blade 217, thereby forming abutting surfaces.

And, as have been explained in the first embodiment, the blank materials 203 and 211 are also butt welded together by using the working head 113 of the butt welding machine.

Figure 4A:
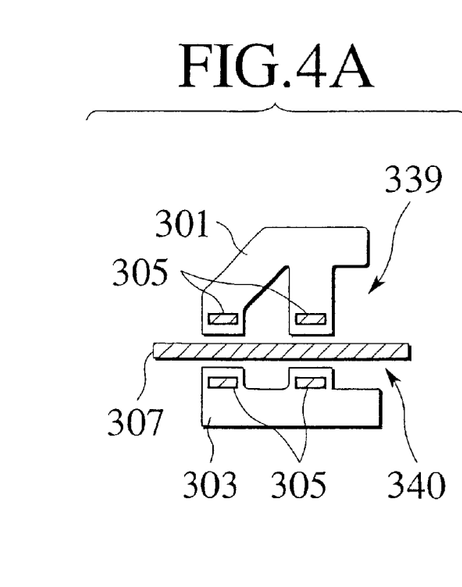
FIGS. 4A, 4B and 4C are function explanatory views conceptually illustrating a method of butt welding according to a third embodiment of the present invention.

Next, a third embodiment where the first and second blank materials are reliably fixed when performing shearing working and also butt welding, will be explained. First, the method of butt welding according to the present invention will be explained conceptually and schematically. As illustrated in FIG. 4A, first and blank material 301, 303 are pressed in a hold-down manner on first and second loading bases 339, 340 by a clamping device 305. And, end portions of the first and second blank materials 301, 303 are sheared with the use of a shearing blade 307, thereby forming joint surfaces 301A, 301B, 303A and 303B.

Figure 4B:
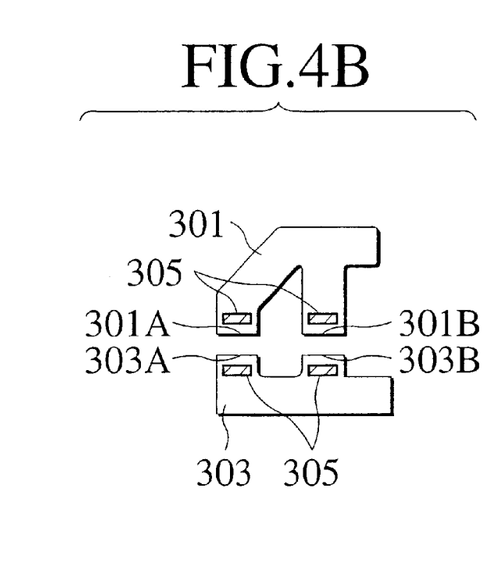
Figure 4C:
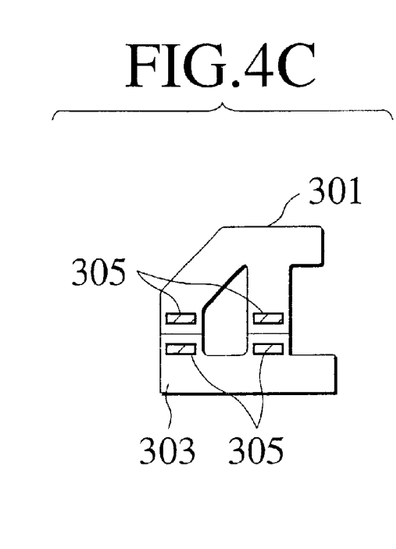

Thereafter, with the first and second blank materials 301, 303 being pressed and fixed by the clamping device 305, the first and second blank materials 301, 303 are conveyed to a succeeding step (FIG. 4B). Then, the joint surfaces 301A, 301B, 303A and 303B of the sheared blank materials 301, 303 are butted together, as shown in FIG. 4C. While the joint surfaces 301A, 301B, 303A and 303B of the first and second blank materials 301 and 303 are being butted together, butt welding is performed thereon.

When the end portions of the first and second blank materials 301, 303 are sheared in the state where the blank materials are pressed and fixed by the clamping device 305 as described above, there is generally the tendency that the joint surfaces 301A, 301B and 303A, 303B after shearing has been done will be deformed due to the release of the residual stress and as the result, the straightness will be impaired. However, in this embodiment, since the first and second blank materials 301 and 303 are in a state where the positions in the vicinity of the joint surfaces thereof are pressed and fixed by the clamping device 305, the deformations of the joint surfaces 301A, 301B, 303A and 303B are suppressed whereby the straightness of the joint surfaces 301A, 301B, 303A and 303B are maintained in good order.

Accordingly, the butts between the joint surfaces 301A, 301B, 303A and 303B of the first and second blank materials 301 and 303 are realized with a high precision. Therefore, through the performance of the butt welding in this state, excellent butt welding is performed with no humping beads being produced.

Next, a fourth embodiment of the improved invention, wherein shearing and butt welding are partly modified from the third embodiment, will be explained hereinbelow.

Figure 5:
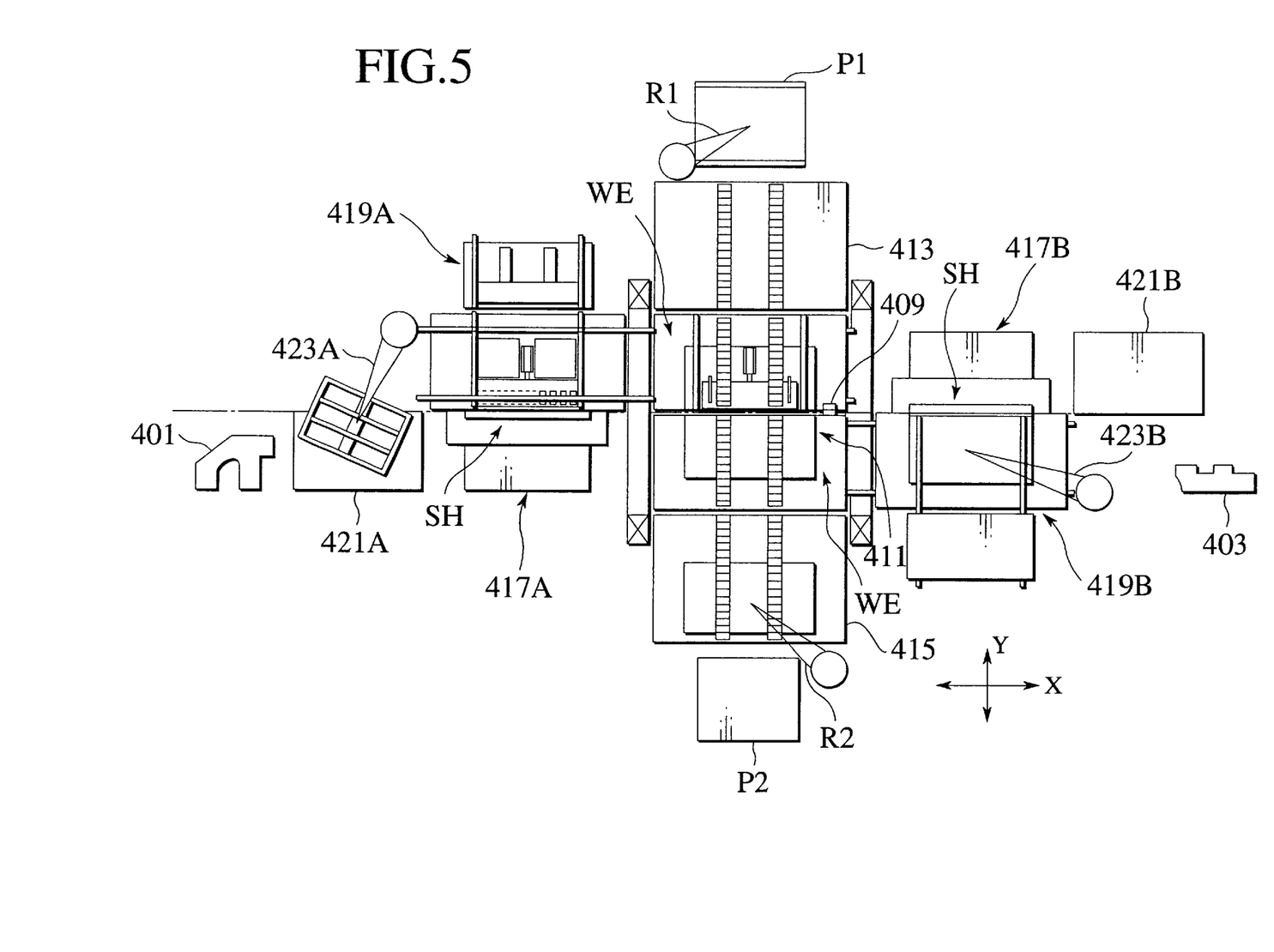
FIG. 5 is a plan explanatory view conceptually illustrating an apparatus for executing the butt welding method according to a fourth embodiment of the present invention.

A plan view of the entire structure is illustrated in FIG. 5. Referring to FIG. 5, the butt welding apparatus 411 is typed as a laser welding machine having a laser working head 409 for causing the condensation of a laser beam oscillated from a laser oscillator (not illustrated) and radiating the laser beam in a vertically downward direction (a direction perpendicular to the sheet surface of FIG. 5) in a form wherein the head 409 is horizontally freely movable in the right and left direction (the X-axial direction). Therefore, the butt welding apparatus is defined as a laser welding machine 411 in this embodiment.

The laser welding machine 411 is equipped with a plasma monitoring device for observing the generated condition of plasma at a laser beam radiating portion with respect to the welded portions of the blank materials and a bead examining device for examining the configuration of a weld bead. It is to be noted that since this type of laser welding machine 411 is known, a detailed description thereof is omitted.

At the positions taken in back-and-forth direction (Y-axial direction) of the laser welding machine 411, there are disposed an OK stage 413 and an NG stage 415 with the laser welding machine 411. And a discrimination is made of the quality of the welded products according to the observed results of the plasma monitoring device and the examined results of the bead examining device. When the welded product is qualified, the product is transferred to the OK stage 413 and the product after the same is welded is stacked on a pallet P1 by means of a robot R1. When the welded product is unqualified, the product is transferred to the NG stage 415 and the unqualified product is stacked on a pallet P2 by means of a robot R2.

On both sides of the laser welding machine 411 as viewed in the right-and-left direction(X-axial direction), first and second shearing machines 417A, 417B are symmetrically disposed with respect to a center point of the laser welding machine 411.

The first and second shearing machines 417A, 417B are disposed in such a manner that first and second blank positioning and conveying devices 419A, 419B oppose the shearing machines 417A, 417B, respectively.

And, at the positions in the vicinity of the first and second blank positioning and conveying devices 419A, 419B, there are disposed first and second stockers 421A, 421B having stacked therein the first and second blank materials 401, 403, respectively. There are provided first and second transfer robots 423A, 423B for transferring the blank materials 401, 403 from the first and second stockers 421A, 421B to the first and second blank positioning and conveying devices 419A, 419B.

The first and second shearing machines 417A, 417B are disposed in the vicinity of an extended line of a moving locus in the X-axial direction of the laser working head 409 of the laser welding machine 411. Each of the shearing machines 417A, 417B is equipped with upper and lower blades 417U, 417L for shearing a relevant work and is also equipped with a back gage for performing positioning of the work so that the back gage may be movable in the back-and-forth direction. This construction is of a general type. Accordingly, a detailed explanation of the first and second shearing machines 417A, 417B will be omitted.

Since the constructions of the first and second blank positioning and conveying devices 419A, 419B are the same, explanations will be given of the construction for only the first blank positioning and conveying devices 419A collectively, hereinbelow.

Figure 6:
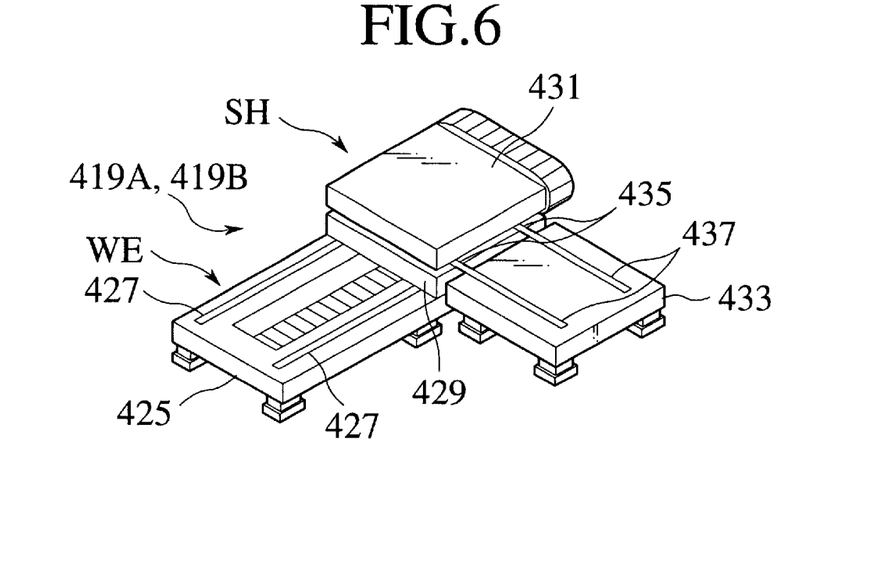
FIG. 6 is a perspective explanatory view illustrating the entire structure of a blank positioning and conveying device.

Referring to FIG. 6, each of the first and the second blank positioning and conveying devices 419A, 419B is equipped on a guide base 425 that extends from a shearing region SH corresponding to the shearing machine 417 to a welding region WE for performing butt welding with the use of the laser welding machine 411. And there is provided a slide base 429 that is reciprocatingly movable between the shearing region SH and the welding region WE along a guide portion 427 equipped on the guide base 425.

The slide base 429 has placed thereon a pallet loader 431. The pallet loader 431 is reciprocatingly freely movable between the shearing region SH and the welding region WE jointly with the slide base 429. And, when the slide base 429 is located in the shearing region SH, the pallet loader 431 is movable onto an auxiliary base 433 that is disposed on a side that is opposite to the side of the shearing machine 417A with the guide base 425 at the center.

Namely, when the slide base 429 is located at the position of the shearing region SH, the guide portion 435 provided on the slide base 429 and the guide portion 437 provided on the auxiliary base 433 are linearly aligned with each other. Accordingly, the pallet loader 431 is freely movable between the slide base 429 and the auxiliary base 433 along the guide portions 435 and 437. When the pallet loader 431 is moved onto the auxiliary base 433, the upper part over the slide base 429 is made open.

Figure 7:
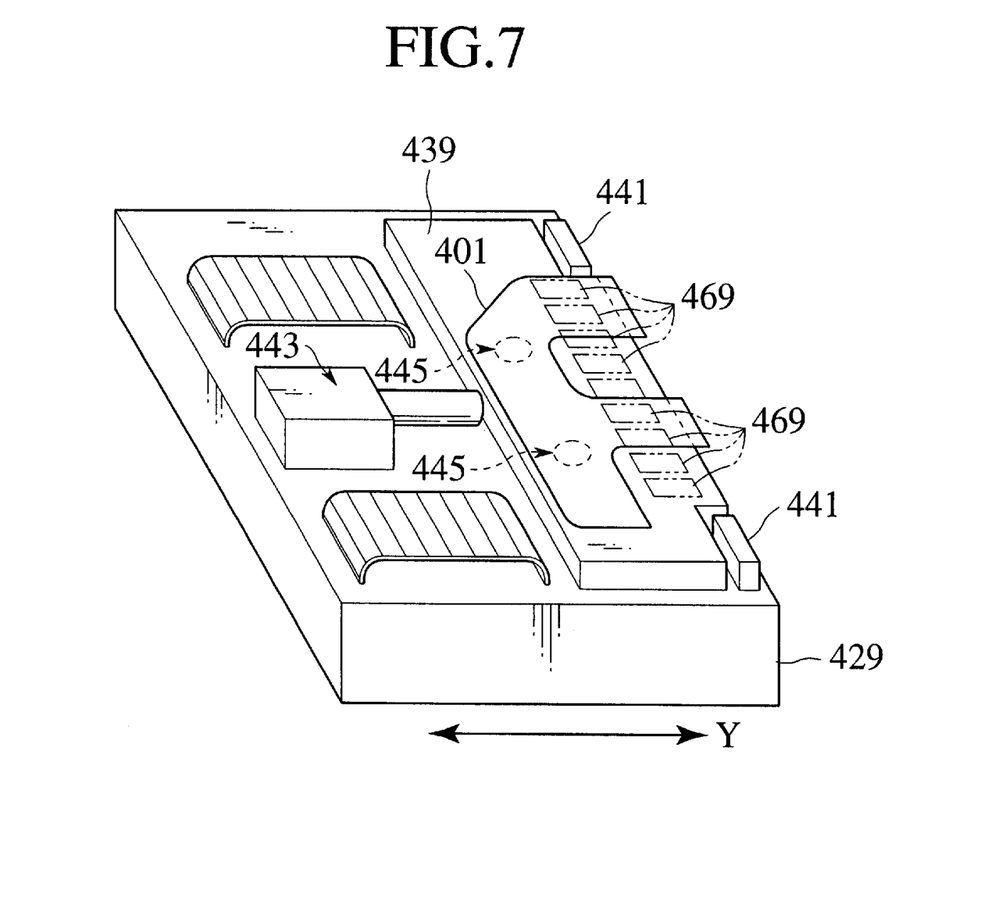
FIG. 7 is a function explanatory view illustrating a loading base.

As illustrated in FIG. 7, on the slide base 429, there is provided a loading base 439 which while supporting the blank material 401 is movable in a direction (Y-axial direction) of moving toward or away from the shearing machine 417A. There are also provided stoppers 441 for regulating the movement of the loading base 439 at the time of butting together the blank materials 401. It is to be noted that the reciprocating movement of the loading base 439 is performed with the use of an actuator 443 that consists of a reciprocating operation device such as an air cylinder.

Figure 8:
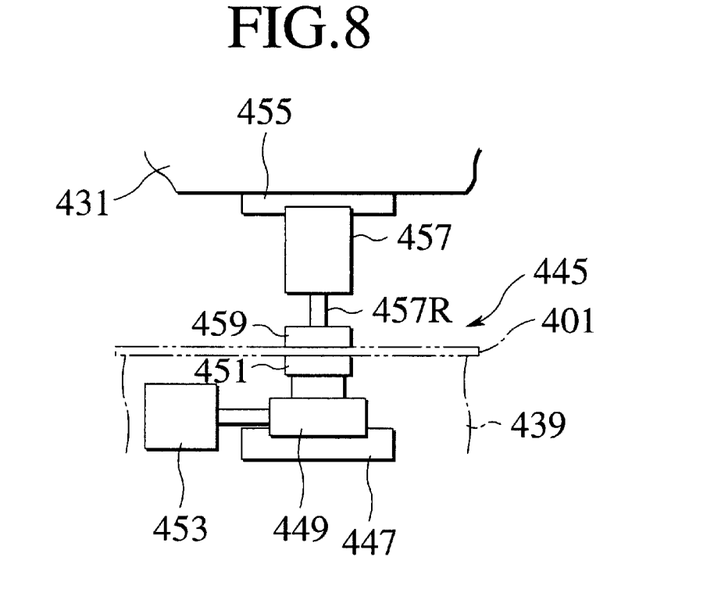
FIG. 8 is a function explanatory view illustrating a blank positioning device.

There are provided blank positioning devices 445 for positioning the blank materials 401 placed on the loading base 439. Namely, as illustrated in FIG. 8, at a plurality of positions of the loading bases 439 there are provided guide portions 447 that are located in a direction (Y-axial direction) of moving toward or away from the shearing machine 417. On a slide block 449 reciprocatingly movable along this guide portion 447 there is mounted a lower clamp 451 capable of supporting the blank material 401 from the lower side in such a way that the lower clamp 451 is horizontally rotatable. Further, in order to reciprocatingly move the slide block 449, there is provided an actuator 453 such as an air cylinder as an example of the reciprocating operation device.

In order to clamp the blank material 401 from the upper side in such a way as to oppose the lower clamp 451, a guide portion 455 that is located in the Y-axial direction is provided on the underside of the pallet loader 431. An upper clamp 459 is horizontally movably provided on the lower end of a vertical rod 457R of an actuator 457 such as an air cylinder as an example of a rise/fall operation device that can be reciprocated along this guide portion 455.

Figure 9:
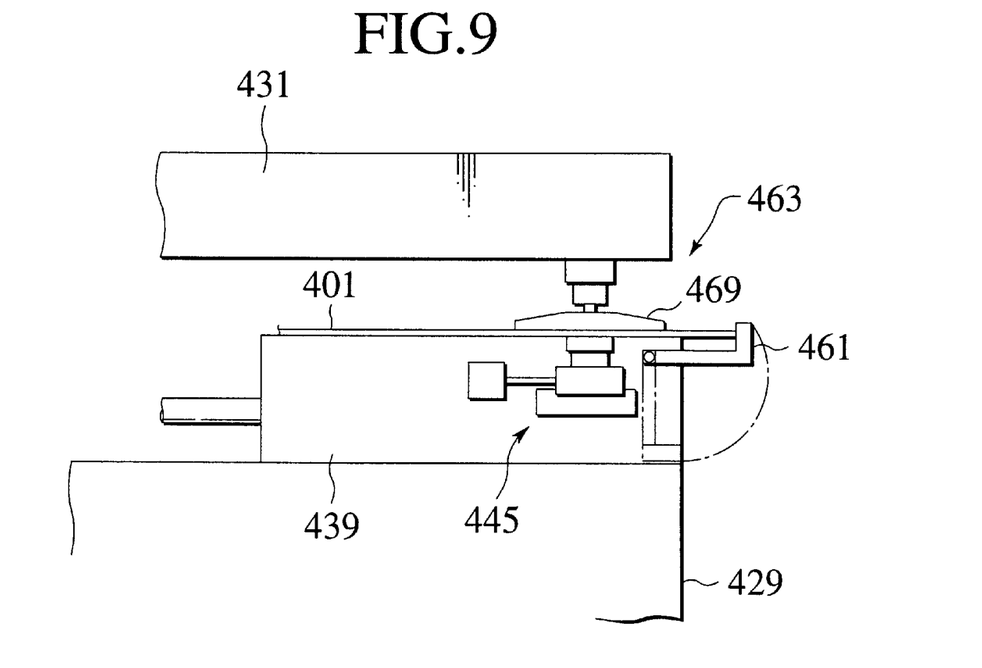
FIG. 9 is a function explanatory view illustrating a blank stopper.

There is provided a blank stopper 461 that when positioning the blank material 401 by the blank positioning device 445 regulates the amount of protrusion of the blank material 401 from the end edge of the loading base 439 to the shearing machine 417. As illustrated in FIG. 9, the blank stopper 461 is provided so that the blank stopper 461 can protrude from the end edge of the loading base 439 toward the shearing machine (in the rightward direction in FIG. 9). In this embodiment, the blank stopper 461 is provided on the loading base 439 vertically rockably and, when the blank stopper 461 has been rocked upward, the blank stopper 461 protrudes from the end edge of the loading base 439 to thereby regulate the movement of the blank material 401.

Incidentally, in short, the blank stopper 461 has only to enable regulating the protrusion length of the blank material as measured from the end edge of the loading base 439. Therefore, it is also possible to make up a construction wherein, for example, a stopper is provided on a forward end portion of a rod that can protrude from or retract into the end edge portion of the loading base 439. It is also possible to adopt various other constructions.

Figure 10:
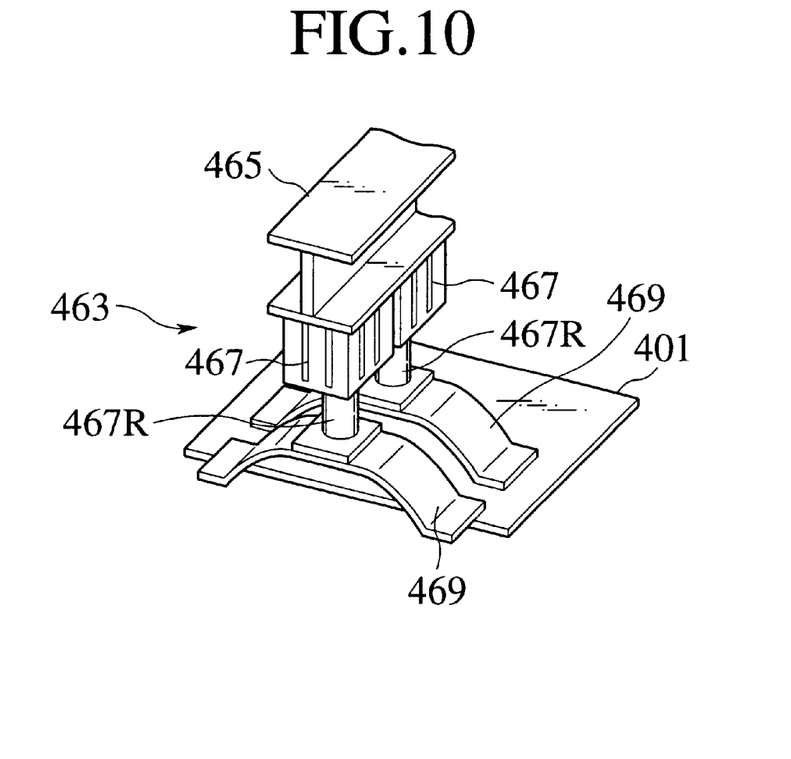
FIG. 10 is a function explanatory view illustrating a clamping device.

There is provided a clamp device 463 for by-clamp pressing and fixing onto the loading base 439 the blank material 401 that has been positioned by the blank positioning devices 445 and blank stoppers 461. More specifically, as illustrated in FIG. 10, on a beam member 465 that is provided with respect to the pallet loader 431 and extends in the X-axial direction, there are provided a plurality of actuators 467 such as air cylinders that serve as an example of force-pressure devices. In addition, dampers 469 are provided respectively on the lower ends of force pressure rods 467R that are movable in the vertical directions. It is to be noted that the clamp device 463 and the blank positioning device 445 are disposed so that both of them do not interfere with each other.

At the position which is located in the vicinity of a sheared surface so that when having sheared the end portion of the blank material 401 by the shearing machine 417 no wrinkle may occur in the blank material 401 due to the influence of a plastic deformation, the clamper 469 presses and fixes the blank material 401 onto the loading base 439.

As to the second blank positioning and conveying device 419B, same constructions for the guide base 425, slide base 429, loading base 439, pallet loader 431 and claming device as the above-described constructions are provided in the second blank positioning and conveying device 419B to shear and position the other blank material 403.

In the above-described construction, when the slide base 429 of the first blank positioning and conveying device 419A is located in the shearing region SH and the pallet loader 431 is located on the auxiliary base 433 whereby the upper zone over the slide base 429 is made open, the first blank material 401 is placed on the loading base 439 by the transfer robot 423.

Thereafter, the pallet loader 431 is moved onto the slide base 429. And the upper clamp 459 provided on the underside of the pallet loader 431 and the lower clamp 451 provided on the loading base 439 are made to oppose each other, whereby the blank material 401 is clamped by the upper and lower clamps 459, 451. And, by operating the actuator 453, the blank material 401 is moved to the shearing machine side so as to protrude from the end edge of the loading base 439. Then, the end portion of the blank material 401 is thereby abutted against a plurality of the blank stoppers 461 and thereby positioned.

After having performed the positioning of the blank material 401, a plurality of the actuators 467 are operated to firmly press and fix the blank material 401 onto the loading base 439 through the use of a plurality of the dampers 469. Thereafter, the blank stopper 461 is moved back to the original position.

Figure 11:
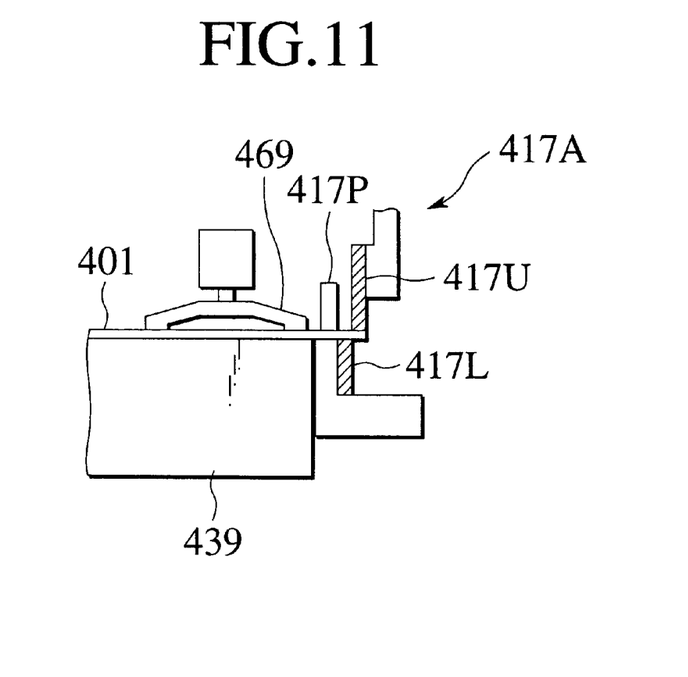
FIG. 11 is a function explanatory view illustrating the relationship between a shearing machine and a clamper.

Thereafter, by operating the actuator 443, the loading base 439 is moved toward the shearing machine 417. Then, the end portion of the blank material 401 that has protruded from the loading base 439 is positioned between the upper and lower blades 417U and 417L of the shearing machine 417 as illustrated in FIG. 11. Then, the end portion thereof is force pressed and fixed onto a table of the shearing machine 417 by means of a plate holding pad 417P equipped to the shearing machine 417. It is to be noted that the positioning of the blank material 401 with respect to the shearing machine 417 can be easily and accurately performed by abutting the end portion of the blank material 401 against the back gage equipped to the shearing machine 417. It is to be noted that the positioning of the blank material 401 with respect to the shearing machine 417 may be performed by abutting the loading base 439 against the stoppers 441.

After having performed the positioning of the blank material 401 with respect to the shearing machine 417 as described above, shearing thereof is performed by the upper and lower blades 417U, 417L. When shearing is performed using the upper and lower blades 417U, 417L as described above, the upper surface of the end portion of the blank material 401 is compressed to thereby form a curved surface as if getting flagging and is plastically deformed and then ruptured and thus sheared.

Figure 12A:
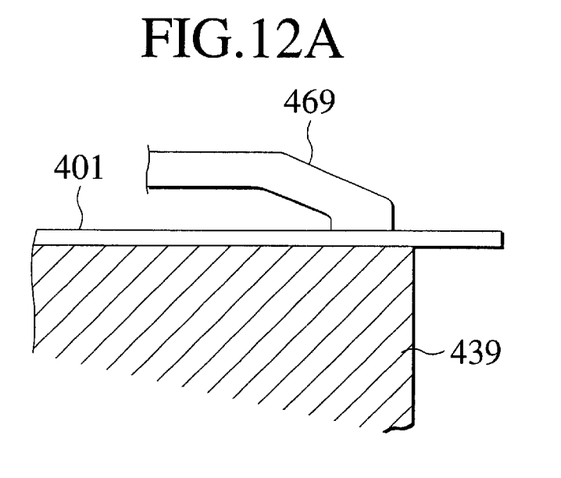
FIGS. 12A, 12B and 12C are function explanatory views illustrating the distance relationship from the clamper to the shearing portion.
Figure 12B:
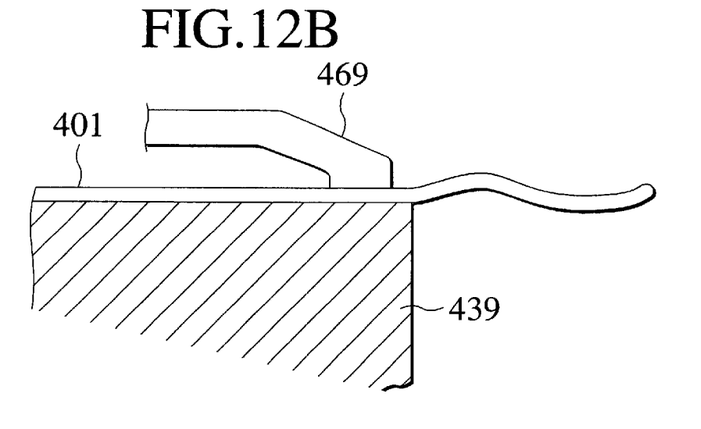
Figure 12C:
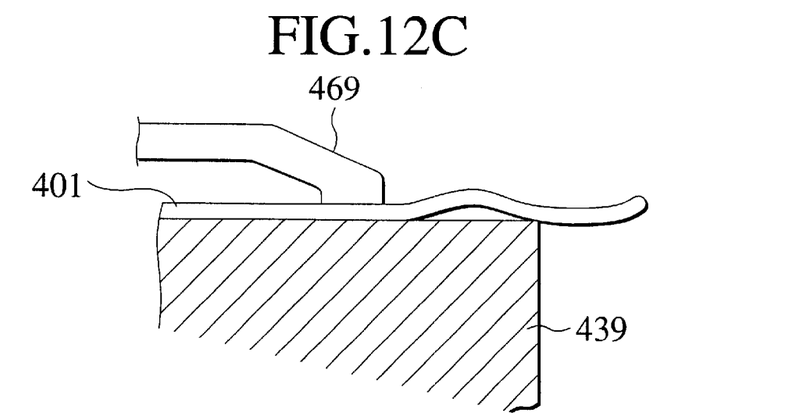

Accordingly, due to the residual stress and plastic deformation of the blank material 401, the shearing of the blank material 401 from one end side owing to the existence of a shear angle in the upper blade 417U, etc., there is the possibility that as illustrated in FIGS. 12B and 12C on an enlarged scale a small level of wrinkle and deformation will occur in the end portion of the blank material 401.

However, in this embodiment, as illustrated in FIG. 12A, the damper 469 by-clamp presses and fixes the blank material 401 by being located in the vicinity of the end edge of the loading base 439. In addition, in order to prevent such wrinkle from occurring, the distance from the damper 469 to the shearing surface is set to be short.

After having sheared the end portion of the blank material 401 by the shearing machine 417 as described above, the blank material 401 is held in the state where the blank material 401 is pressed and fixed onto the loading base 439 by the damper 469. Then, the blank material 401 is suitably moved away from the shearing machine 417. Thereafter, the slide base 429 is moved to the welding region WE.

The above-described way of operation is performed in each of the first and second blank positioning and conveying devices 419A and 419B. When the slide base 429 in each of the first and second blank positioning and conveying devices 419A and 419B is positioned in the welding region WE as mentioned previously, the first and second blank materials 401 and 403 are made to oppose each other at a position that is below the laser working head 409 of the laser welding machine 411.

When operating the respective actuators 443 at the time when the first and second blank material 401 and 403 oppose each other as described above and causing the respective loading bases 439 to abut against the respective stoppers 441, the sheared joint surfaces of the first and second blank materials 401 and 403 are butted together with a high precision. In the state where the joint surfaces of the first and second blank materials 401 and 403 are butted together in this way, laser beams are radiated onto the joint surfaces from the laser working head 409 and laser welding is performed thereon. As a result, a good quality of butt welding is performed.

As will be apparent from the foregoing explanations, in this embodiment, in the state where the first and second blank materials 401 and 403 are pressed and fixed onto the loading base 439, the end portions thereof are cut off to thereby form the joint surfaces. And, while the above-described force pressed and fixed state is being maintained, the joint surfaces of the first and second blank materials 401 and 403 are butted together. This suppresses the deformation due to, for example, the residual stress and thereby maintains the joint surfaces to have a straightness, whereby the joint surfaces are butted together in this condition. This makes it possible to perform highly precise butt welding and hence to perform a good quality of butt welding.

The entire contents of Japanese Patent Application P10-117317 (filed Apr. 27, 1998) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. For example, the butt welding machine can be arc welding machine, spot welding machine, gas welding machine or plasma welding machine other than the laser welding machine. Furthermore, the shearing machine can be replaced to laser cutting machine. The scope of the invention is defined with reference to the following claims.

What is claimed is:

1. A method of butt welding, comprising the steps of:

pressing first and second blank materials onto first and second loading bases respectively by first and second clamping devices, thereby fixing the first and second blank materials;

shearing end surfaces of the first and second blank materials by an upper blade and a lower blade of a first shearing machine and by an upper blade and a lower blade of a second shearing machine which are stationary in a manner such that the first and second blank materials are maintained in fixed state where the first and second blank materials are continuously pressed by the first and second clamping devices during the shearing operation, thereby forming joint surfaces wherein the first clamping device clamps the first blank material in a vicinity of the upper blade and a lower blade of a first shearing machine and the second clamping device clamps the second blank material in a vicinity of the upper blade and a lower blade of a second shearing machine so that no wrinkle may occur in the first and second blank materials due to Influence of plastic deformation;

transferring the first and second blank materials respectively in a first and a second directions from the first and second shearing machines to a butt welding machine by the first and second loading bases in a manner such that the first and second blank materials are maintained in fixed state where the first and second blank materials are continuously pressed by the clamping devices during the transferring operation;

moving the first and second blank materials respectively in third and fourth directions perpendicular to the first and second directions in a manner such that the first and second blank materials are maintained in fixed state where the first and second blank materials are continuously pressed by the clamping devices during the moving operation, thereby butting the joint surfaces of the first and second blank materials; and performing butt welding by a butt welding machine on each of the joint surfaces of the first and second blank materials in a manner such that the first and second blank materials are maintained in fixed state where the first and second blank materials are continuously pressed by the clamping devices during the butt welding operation, wherein the first and second blank materials are continuously clamped in such a manner that the clamping devices press the upper faces of the blank materials on the first and second loading bases through the lower faces of the blank materials so that the blank materials are restrained from moving relatively to the clamping devices and the first and second loading bases throughout the whole of the shearing operation performed by the first and the second shearing machines, the transferring operation in the first and second directions, the moving operation in the third and fourth directions, and the butt welding operation.

2. The method of butt welding according to claim 1, wherein the third direction opposes to the fourth direction;

the first blank material is moved toward the butt welding machine in the third direction; and the second blank material is moved toward the butt welding machine in the fourth direction which opposes to the third direction.

3. An apparatus of butt welding, comprising:

a first loading base having a first clamping device to clamp a first blank material, the first clamping device holding the first blank material in a state where this blank material is pressed and fixed on the first loading base;

a second loading base having a second clamping device to clamp a second blank material, the second clamping device holding the second blank material In a state where this blank material is pressed and fixed on the second loading base;

a first stationary shearing machine having upper and lower blades to shear an end surface of the first blank material which is pressed and fixed on the first loading base by the first clamping device, thereby forming a joint surface, wherein the first clamping device clamps the first blank material in a vicinity of the upper blade and a lower blade of a first shearing machine so that no wrinkle may occur in the first blank material due to influence of plastic deformation;

a second stationary shearing machine having upper and lower blades to shear an end surface of the second blank material which is pressed and fixed on the second loading base by the second clamping device, thereby forming another joint surface, wherein the second clamping device clamps the second blank material in a vicinity of the upper blade and a lower blade of the second shearing machine so that no wrinkle may occur in the second blank material due to influence of plastic deformation;

a first slide base transferring the first loading bass in a first direction from the first shearing machine to a butt welding machine, a second slide base transferring the second loading base in a second direction from the second shearing machine to the butt welding machine, a first and a second actuators to move the first and second loading bases respectively in a third and a fourth directions perpendicular to the first and second directions so as to butt the joint surfaces of the first and the second blank materials; and a butt welding machine to perform butt welding on the joint surfaces of the first and second blank materials, wherein the first and second blank materials are continuously clamped in such a manner that the clamping devices press the upper faces of the blank materials on the first and second loading bases through the lower faces of the blank materials so that the blank materials are restrained from moving relatively to the clamping devices and the first and second loading bases throughout whole of the shearing operations performed by the first and the second shearing machines, transferring operations by the first and second slides bases, butting operations by the first and second actuators, and a butt welding operation by the butt welding machine, wherein the first shearing machine is located in one side of the butt welding machine;

the second shearing machine is located in the other side of the butt welding machine so that the butt welding machine is located so as to be sandwiched by the first and the second shearing machines;

the first actuator is located in the one side of the butt welding machine so as to move the first slide base from the first shearing machine toward the butt welding machine in the third direction;

the second actuator is located in the other side of the butt welding machine so as to move the second slide base from the second shearing machine toward the butt welding machine in the fourth direction opposing to the third direction, thereby moving the first blank material toward the butt welding machine from the first shearing machine in the third direction and moving the second blank material toward the butt welding machine in the fourth direction from the second shearing machine.

* * * * *